United States Patent
Yoo et al.

(10) Patent No.: US 9,604,706 B2
(45) Date of Patent: Mar. 28, 2017

(54) SHIP FOR SUPPLYING LIQUIFIED FUEL GAS

(75) Inventors: Seong Jin Yoo, Geoje-si (KR); Sung Jun Lee, Geoje-si (KR); Dong Kyu Choi, Geoje-si (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 664 days.

(21) Appl. No.: 13/502,361

(22) PCT Filed: Oct. 5, 2010

(86) PCT No.: PCT/KR2010/006788
§ 371 (c)(1),
(2), (4) Date: Jun. 5, 2012

(87) PCT Pub. No.: WO2011/046315
PCT Pub. Date: Apr. 21, 2011

(65) Prior Publication Data
US 2012/0240874 A1    Sep. 27, 2012

(30) Foreign Application Priority Data
Oct. 16, 2009   (KR) .......................... 10-2009-0098986

(51) Int. Cl.
*B63B 25/16*   (2006.01)
*B63B 27/34*   (2006.01)
(Continued)

(52) U.S. Cl.
CPC .............. *B63B 27/34* (2013.01); *B63B 25/16* (2013.01); *B63B 27/24* (2013.01); *B63H 21/38* (2013.01);
(Continued)

(58) Field of Classification Search
CPC ...... F17C 6/00; F17C 7/00; F17C 7/02; F17C 5/007; F17C 5/02; F17C 3/025;
(Continued)

(56) References Cited

U.S. PATENT DOCUMENTS 3,345,971 A * 10/1967 Stanwick ..................... 114/242
4,276,749 A *  7/1981 Crowley ...................... 62/48.2
(Continued)

FOREIGN PATENT DOCUMENTS

CN      202252833 U    5/2012
EP       2072885 A1    6/2009
(Continued)

OTHER PUBLICATIONS

Japanese Office Action dated Oct. 1, 2013 of corresponding Japanese Patent Application No. 2012-534098—3 pages.
(Continued)

*Primary Examiner* — Frantz Jules
*Assistant Examiner* — Brian King
(74) *Attorney, Agent, or Firm* — Knobbe Martens Olson & Bear LLP

(57) ABSTRACT

A ship for bunkering liquefied fuel gas to a liquefied-fuel-gas propulsion ship includes: a liquefied-fuel-gas storage tank installed in the ship; a fuel supply pipe connected to the liquefied-fuel-gas storage tank and supplying fuel to the liquefied-fuel-gas propulsion ship; and a BOG collection pipe collecting BOG produced in a liquefied fuel gas tank of the liquefied-fuel-gas propulsion ship.

5 Claims, 2 Drawing Sheets

(51) Int. Cl.
  *B63B 27/24* (2006.01)
  *F17C 9/02* (2006.01)
  *B63H 21/38* (2006.01)
  *B63H 21/14* (2006.01)
  *B63J 99/00* (2009.01)

(52) U.S. Cl.
  CPC ............... *F17C 9/02* (2013.01); *B63H 21/14* (2013.01); *B63J 2099/003* (2013.01); *F17C 2205/0352* (2013.01); *F17C 2221/033* (2013.01); *F17C 2221/035* (2013.01); *F17C 2223/0153* (2013.01); *F17C 2227/0135* (2013.01); *F17C 2227/0157* (2013.01); *F17C 2260/013* (2013.01); *F17C 2265/031* (2013.01); *F17C 2265/037* (2013.01); *F17C 2265/065* (2013.01); *F17C 2270/0105* (2013.01); *F17C 2270/0113* (2013.01); *F17C 2270/0123* (2013.01); *F17C 2270/0136* (2013.01); *Y02T 70/5218* (2013.01); *Y02T 70/5263* (2013.01)

(58) Field of Classification Search
  CPC .... F17C 1/002; F17C 13/082; F17C 2265/03; F17C 2265/038; B63B 25/16; B63B 27/24
  USPC .......................................................... 62/620
  See application file for complete search history.

(56) References Cited

U.S. PATENT DOCUMENTS

| | | | | |
|---|---|---|---|---|
| 4,924,822 | A * | 5/1990 | Asai et al. | 123/27 GE |
| 6,945,187 | B1 * | 9/2005 | Woodall et al. | 114/256 |
| 2004/0068993 | A1 * | 4/2004 | Irie et al. | 62/48.2 |
| 2005/0132719 | A1 * | 6/2005 | Svensson et al. | 62/50.1 |
| 2006/0042312 | A1 * | 3/2006 | Winningham | F17C 5/06 |
| | | | | 62/620 |
| 2006/0053806 | A1 * | 3/2006 | Tassel | B63B 25/16 |
| | | | | 62/48.1 |
| 2006/0076076 | A1 | 4/2006 | Darling, IV et al. | |
| 2007/0125122 | A1 * | 6/2007 | Mak | F17C 3/00 |
| | | | | 62/620 |
| 2008/0008602 | A1 * | 1/2008 | Pozivil et al. | 417/243 |
| 2008/0308175 | A1 * | 12/2008 | Lee | F17C 13/004 |
| | | | | 141/11 |
| 2009/0199575 | A1 * | 8/2009 | Faka | 62/50.1 |
| 2009/0211263 | A1 | 8/2009 | Coyle | |
| 2009/0217676 | A1 * | 9/2009 | Mak | 62/50.1 |
| 2010/0139316 | A1 * | 6/2010 | An et al. | 62/613 |
| 2011/0067439 | A1 * | 3/2011 | Bridgwood | F25J 1/0022 |
| | | | | 62/606 |

FOREIGN PATENT DOCUMENTS

| | | |
|---|---|---|
| GB | 2471909 A | 1/2011 |
| JP | 02-162188 A | 6/1990 |
| JP | 06-336193 A | 12/1994 |
| JP | 2000-503108 A | 3/2000 |
| JP | 2001-132898 A | 5/2001 |
| JP | 2004-131024 A | 4/2004 |
| JP | 2004-284579 A | 10/2004 |
| WO | 2008-000898 A1 | 1/2008 |
| WO | 2008-075882 A1 | 6/2008 |

OTHER PUBLICATIONS

International Search Report dated Jun. 15, 2011 of PCT/KR2010/006788 which is the parent application—6 pages.
Extended European Search Report dated Apr. 1, 2014 of corresponding European Patent Application No. 10765560.7—7 pages.
Australian Office Action dated Jun. 17, 2013 of corresponding Australian Patent Application No. 2010307574—3 pages.
Australian Office Action dated Jul. 8, 2014 of corresponding Australian Patent Application No. 2010307574—3 pages.
Written Opinion and Search Report Action dated May 2, 2014 of corresponding Singapore Patent Application No. 201202780-1—15 pages.

* cited by examiner

SHIP FOR SUPPLYING LIQUIFIED FUEL GAS

TECHNICAL FIELD

The present invention relates to a ship for bunkering liquefied fuel gas, and more particularly, to a ship for bunkering liquefied fuel gas to a ship, which uses the liquefied fuel gas as fuel, on the sea.

BACKGROUND ART

Until now, a propulsion engine which uses oil as fuel has been generally used in a merchant ship such as a container carrier or a passenger ship. Due to the recent oil price increase, however, more and more ships are employing a propulsion engine which uses liquefied fuel gas, for example, liquefied natural gas (LNG), liquefied petroleum gas (LPG), or dimethyl ether (DME) which is much cheaper than oil. Furthermore, since the price of LNG in the summer season is 50% lower than in the winter season, LNG may be purchased and stored in the summer season. Therefore, LNG has an advantage in terms of price.

A ship having a liquefied-fuel-gas propulsion engine mounted therein includes a fuel tank which is filled with liquefied fuel gas before sailing. Currently, however, there are not so many harbors provided with a liquefied fuel gas storage facility, for example, an LNG terminal. Furthermore, a current liquefied fuel gas storage facility serves only to transfer liquefied fuel gas stored in a liquefied fuel gas carrier to the ground. For safety reasons, the liquefied fuel gas storage facility is generally located in a position remote from a harbor in which a merchant ship such as a container carrier is at anchor in order for loading and unloading. Therefore, the container carrier should sail to the liquefied fuel gas storage facility located in a position remote from the harbor in order to refuel.

In general, a lot of time and efforts are required to anchor a ship. Therefore, moving the ship to a position remote from a harbor for bunkering may be an unproductive operation which requires a lot of time and efforts and an additional cost.

DISCLOSURE

Technical Problem

An embodiment of the present invention is directed to a ship for bunkering liquefied fuel gas to a liquefied-fuel-gas propulsion ship on the sea.

Another embodiment of the present invention is directed to a ship for bunkering liquefied fuel gas, which includes a facility capable of treating boil-off gas (BOG) produced while supplying liquefied fuel gas.

Advantageous Effects

According to the embodiment of the present invention, fuel may be bunkered to the liquefied-fuel-gas propulsion ship on the sea by the ship for bunkering liquefied fuel gas. Therefore, a time and effort required for refueling the liquefied-fuel-gas propulsion ship may be considerably reduced, and a cost required for bunkering liquefied fuel gas may be reduced. Furthermore, since the ship for bunkering liquefied fuel gas includes the BOG treatment facility, the liquefied-fuel-gas propulsion ship does not need to include a facility for treating a large amount of BOG produced during the liquefied fuel gas supply process. Therefore, it is possible to save a cost of the liquefied-fuel-gas propulsion ship.

DESCRIPTION OF THE SYMBOLS IN MAIN PORTIONS OF THE DRAWINGS

Figure 1:
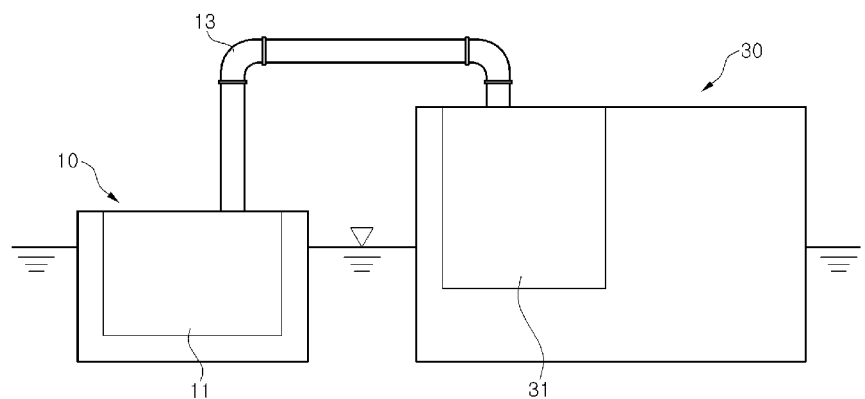
FIG. 1 is a diagram explaining a case in which a ship for bunkering liquefied fuel gas according to an embodiment of the present invention supplies fuel to a liquefied-fuel-gas propulsion ship on the sea.

10: LNG supply ship
11: LNG storage tank
12: pump
13: fuel supply pipe
14: BOG collection pipe
15: high-pressure compressor
16: storage tank
17: low-pressure compressor
18: reliquefaction unit
19: energy consumer
30: LNG propulsion ship
31: LNG fuel tank

BEST MODE

According to an aspect of the present invention, a ship for bunkering liquefied fuel gas to a liquefied-fuel-gas propulsion ship includes: a liquefied-fuel-gas storage tank installed in the ship; a fuel supply pipe connected to the liquefied-fuel-gas storage tank and bunkering fuel to the liquefied-fuel-gas propulsion ship; and a BOG collection pipe collecting BOG produced in a liquefied fuel gas tank of the liquefied-fuel-gas propulsion ship.

The ship may further include a BOG treatment unit. The BOG collected through the BOG collection pipe may be treated by the BOG treatment unit.

The BOG treatment unit may include a vent for discarding the BOG to the air or a gas burner for burning the BOG.

The BOG treatment unit may include a propulsion engine, a boiler, a gas turbine, or a generator of the ship, to which the BOG is supplied and consumed.

The BOG treatment unit may include a storage tank which compresses the BOG collected through the BOG collection pipe at a high pressure and stores the compressed BOG.

The BOG stored in the storage tank may be consumed in a propulsion engine, a boiler, a gas turbine, or a generator of the ship.

The BOG stored in the storage tank may be used as a pressure source which is supplied to the liquefied-fuel-gas storage tank to supply the liquefied fuel gas of the liquefied-fuel-gas storage tank to the liquefied-fuel-gas propulsion ship.

The BOG treatment unit may include a reliquefaction unit which reliquefies the BOG collected through the BOG collection pipe.

The ship may further include a branch pipe diverging from the BOG collection pipe and connected to an upper portion of the liquefied-fuel-gas storage tank.

MODE FOR INVENTION

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
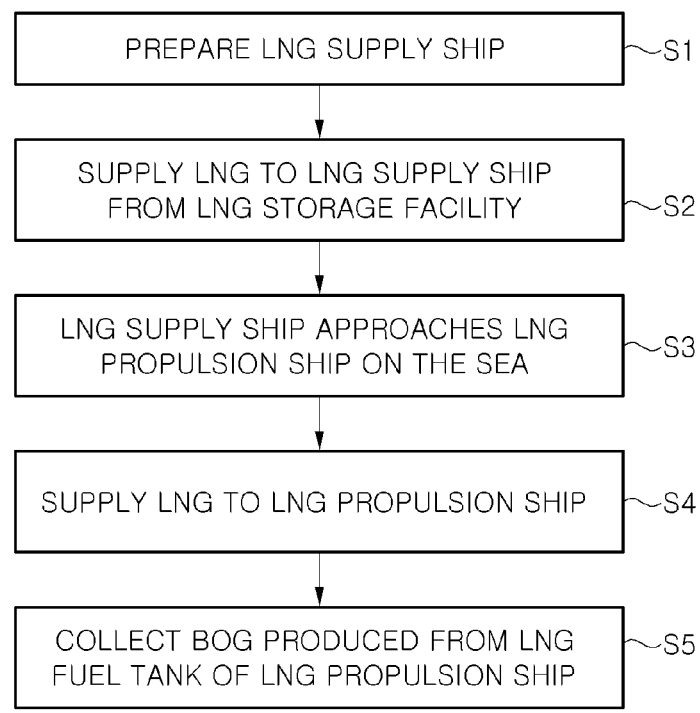
FIG. 2 is a flow chart showing a method for supplying fuel to the liquefied-fuel-gas propulsion ship from the ship for bunkering liquefied fuel gas according to the embodiment of the present invention.

FIG. 1 is a diagram explaining a case in which a ship for bunkering liquefied fuel gas according to an embodiment of the present invention supplies fuel to a liquefied-fuel-gas propulsion ship on the sea. FIG. 2 is a flow chart showing a method for supplying fuel to the liquefied-fuel-gas propulsion ship from the ship for bunkering liquefied fuel gas according to the embodiment of the present invention.

The embodiment of the present invention proposes a method in which a ship 10 for bunkering liquefied fuel gas is provided to directly supply fuel to a liquefied-fuel-gas propulsion ship 30 on the sea. Here, the liquefied fuel gas may include fuel gas such as LNG, LPG, or DME which is liquefied and stored.

LNG is obtained by liquefying natural gas taken from a gas field and is composed mainly of methane. When the temperature of LNG is reduced or a pressure is applied to liquefy LNG, the volume of LNG is reduced to about 1/600. Therefore, LNG has an advantage in terms of spatial efficiency. However, since the boiling point of LNG is as low as 162 degrees below zero, LNG should be contained in a tank or container, which is thermally insulated in a special manner, such that the temperature thereof is maintained to less than the boiling point, when LNG is stored.

LPG is obtained by applying a relatively low pressure (6-7 $kg/cm^2$) to heavy hydrocarbon and liquefying the heavy hydrocarbon. The heavy hydrocarbon including two or more carbon atoms may be obtained when crude oil is taken from an oil field or refined or when natural gas is taken. When LPG is liquefied, the volume of LPG is reduced to about 1/250. Therefore, LPG is conveniently stored and carried compared with LNG. Furthermore, LPG is composed mainly of propane and butane, and may include small amounts of ethane, propylene, and butylene.

DME, a kind of ether, has a lower inflammability than LPG and is non-toxic. Since DME contains a large percentage of oxygen, a small amount of smoke is produced when DME is burned. Therefore, DME has a low environmental load.

Hereinafter, an LNG propulsion ship which uses LNG as fuel among the above-described liquefied fuel gases will be taken as an example in the following descriptions.

When a ship such as a container carrier uses LNG as propulsion fuel, a LNG fuel tank 31 needs to be charged with LNG before sailing. As described above, there are not so many harbors provided with an LNG storage facility (for example, LNG terminal). Furthermore, although there is an LNG storage facility in a harbor, the LNG storage facility is located in a position remote from a place where containers are unloaded from a container carrier, for safety reasons. Therefore, the container carrier should move to the LNG storage facility remote from the loading and unloading place, in order to refuel. Furthermore, moving the ship to a position remote from the harbor to refuel the ship may be an unproductive operation which requires a lot of time and efforts.

In this embodiment of the present invention, an LNG bunkering ship 10 provided with an LNG storage tank 11 directly goes to a place where an LNG propulsion ship 30 is positioned, and supplies LNG to the LNG propulsion ship 30 on the sea.

Referring to FIG. 2, the LNG bunkering ship 10 is prepared (step S1). The LNG bunkering ship 10 includes the LNG storage tank 11 and a fuel supply pipe 13 to supply LNG stored in the LNG storage tank 11 to the LNG propulsion ship 30.

Next, the LNG storage tank 11 of the LNG bunkering ship 10 is filled with LNG from the LNG storage facility (step S2). The LNG storage facility may include a floating LNG storage facility, an LNG carrier ship, or an LNG ground terminal. More specifically, the LNG storage facility may include LNG-floating production storage offloading (FPSO), an LNG carrier (LNGC), or an LNG shuttle regasification vessel (SRV).

Then, the LNG bunkering ship 10 approaches the LNG propulsion ship 30 on the sea (step S3).

Next, the LNG stored in the LNG storage tank 11 is supplied to the LNG fuel tank 31 of the LNG propulsion ship 30 (step S4).

While the LNG is supplied, the LNG is evaporated, and thus boil-off gas (BOG) is generated. Therefore, the method may further include collecting the BOG generated from the LNG fuel tank 31 of the LNG propulsion ship 30 into the LNG bunkering ship 10 (step S5).

According to the above-described method, while containers are loaded on and unloaded from the LNG propulsion ship 30, for example, a container carrier, the LNG propulsion ship 30 may be refueled by the LNG bunkering ship 10 on the sea. Therefore, it is possible to reduce a lot of time and effort required for refueling the LNG propulsion ship 30. Accordingly, a cost required for bunkering LNG may decrease.

Figure 3:
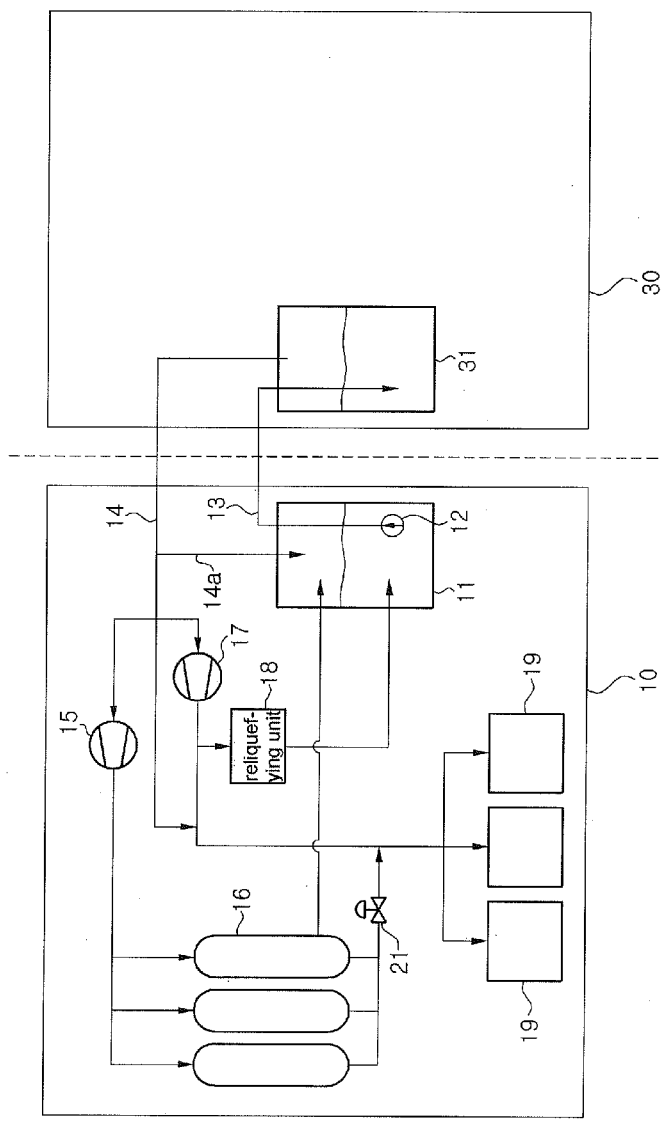
FIG. 3 is a diagram explaining a method for treating the BOG produced when the ship for bunkering liquefied fuel gas according to the embodiment of the present invention supplies liquefied fuel gas.

FIG. 3 is a diagram explaining a method for treating the BOG produced when the LNG bunkering ship according to the embodiment of the present invention supplies LNG.

The LNG bunkering ship 10 includes the LNG storage tank 11, the fuel supply pipe 13, a BOG collection pipe 14, and so on. The LNG bunkering ship 10 approaches the LNG propulsion ship 30 on the sea to supply LNG to the LNG propulsion ship 30.

The LNG stored in the LNG storage tank 11 is supplied to the LNG fuel tank 31 of the LNG propulsion ship 30 through the fuel supply pipe 13 from the LNG storage tank 11 by a pressure caused by a pump 12.

The liquefaction temperature of LNG is as very low as 163 degrees below zero at an ambient pressure. Therefore, even when the temperature of LNG is slightly higher than degrees below zero at an ambient pressure, the LNG is evaporated. The LNG storage tank 11 or the LNG fuel tank 31 is thermally insulated. However, since an external heat is continuously transmitted to the LNG, the LNG stored in the LNG storage tank 11 or the LNG fuel tank 31 is continuously evaporated during the LNG supply process, and BOG is thus produced. In general, the amount of BOG produced in the LNG storage tank 11 becomes much larger than the amount of BOG produced in the LNG fuel tank 31 to which the LNG is supplied.

When the BOG is continuously generated, the pressure of the LNG storage tank 11 or the LNG fuel tank 31 excessively increases. Therefore, the produced BOG is discharged to the air or burned away.

For example, a 14000 TEU (Twenty-foot Equivalent Unit) container carrier may include an LNG fuel tank 31 having a capacity of 15000 m$^3$. When LNG is supplied to the fuel tank, a considerable amount of BOG may be produced. For example, 3 ton or more of BOG per hour is produced. Since the BOG is inflammable gas, it is dangerous to treat the BOG in a merchant ship such as a container carrier. Furthermore, when the BOG is not utilized as an energy source but is discharged to the air or burned away, precious energy may be wasted.

Therefore, the LNG bunkering ship 10 according to the embodiment of the present invention includes a unit for collecting the BOG produced from the LNG propulsion ship 30 during the LNG supply process.

The BOG produced from the LNG fuel tank 31 of the LNG propulsion ship 30 is collected through a BOG collection pipe 14 installed in the LNG bunkering ship 10. The BOG collection pipe 14 is connected to an upper portion of the LNG fuel tank 31 of the LNG propulsion ship 30.

A part of the BOG collected through the BOG collection pipe 14 may be supplied to an upper portion of the LNG storage tank 11 through a branch pipe 14a. As the LNG supply is performed, the pressure inside the LNG storage tank 11 continuously decreases, and the pressure inside the LNG fuel tank 31 continuously increases. Therefore, unless the pressure applied by the pump 12 is gradually increased, the LNG supply is not performed smoothly. The decrease of the pressure inside the LNG storage tank 11 is compensated by the BOG supplied through the branch pipe 14a. Therefore, when the branch pipe 14a diverging from the BOG collection pipe 14 is connected to the upper portion of the LNG storage tank 11, the pressure inside the LNG storage tank 11 may be supplemented to perform the LNG supply smoothly.

The BOG collected through the BOG collection pipe 14 is treated by a BOG treatment unit. The BOG treatment unit includes a variety of components capable of treating BOG, which are well-known to those skilled in the art.

The BOG treatment unit may include a vent for discharging BOG to the air or a gas burner for burning BOG. The gas burner may include a gas combustion unit (GCU) or a flare tower. The reason that the BOG is collected into the LNG bunkering ship 10 and discharged to the air or burned away is that it is not easy to install a BOG pipe in the LNG propulsion ship 30 such as a container carrier because cargoes are loaded on the LNG propulsion ship 30. Furthermore, since the BOG is an inflammable gas, an unexpected fire or explosion may occur.

The BOG treatment unit may be an energy consumer 19 installed in the LNG bunkering ship 10 to consume the BOG collected through the BOG collection pipe 14. The energy consumer 19 is a component capable of using the BOG as an energy source. For example, the energy consumer 19 may include an LNG propulsion engine, a boiler, a gas turbine, a generator and so on, which are installed in the LNG bunkering ship 10. As a propulsion engine of the LNG bunkering ship 10, an engine using LNG as fuel may be installed. Such an engine may include an ME-GI engine. The BOG may be compressed by a high-pressure compressor 15 and then used as fuel by the LNG propulsion engine. Furthermore, the BOG may be compressed by a low-pressure compressor 17 and then supplied to a power generation engine, for example, a dual fuel diesel electric (DFDE) engine or gas turbine to generate electricity. Furthermore, the BOG may be supplied to the boiler and then used as a heat source. When the BOG is supplied to such an energy consumer 19, the BOG may be compressed by the high-pressure compressor 15 or the low-pressure compressor 17 depending on a required pressure.

The BOG treatment unit may include a storage tank 16 for storing the BOG which is collected through the BOG collection pipe 14 and compressed at a high pressure by the high-pressure compressor 15. The BOG stored in the storage tank 16 may be used for various purposes. For example, the BOG may be transferred to the LNG propulsion engine and then used as fuel. In this case, the BOG may be decompressed while passing through a valve 21, and then transferred to the energy consumer 19. Furthermore, the BOG may be supplied to the LNG storage tank 11 and then used as a pressure source for supplying the LNG of the LNG storage tank to the LNG propulsion ship. In this case, the LNG in the storage tank 11 may be supplied to the LNG fuel tank 31 only by the pressure of the BOG stored in the storage tank 16, without supplementing the pressure of the pump 12 or using the pump 12.

The BOG treatment unit may include a reliquefaction unit 18 for reliquefying the BOG collected through the BOG collection pipe 14. The reliquefied LNG may be retransferred to the LNG storage tank 11. In this case, the BOG may pass through the low-pressure compressor 17.

As described above, when the LNG bunkering ship 10 supplies LNG to the LNG propulsion ship 30, BOG may be produced, and the produced BOG may be collected by the BOG collection pipe 14. Then, the BOG treatment unit treats the collected BOG through a variety of methods. This is because it is not easy to treat the BOG in the LNG propulsion ship 30 and an unexpected situation may occur.

After the BOG is collected into the LNG bunkering ship 10, the collected BOG may be discarded to the air or burned away. Furthermore, the BOG may be supplied to the LNG storage tank 11 through the branch pipe 14a diverging from the BOG collection pipe 14, and may supplement the pressure inside the LNG storage tank 11 which is reduced while the LNG is supplied. Furthermore, the BOG may be used as an energy source of the energy consumer 19. In addition, the BOG may be compressed at a high pressure, stored in the storage tank 16, and used later.

As the BOG produced during the LNG bunkering process is collected into the LNG bunkering ship 10 and treated by the BOG treatment unit, the LNG propulsion ship 30 does not need to include a facility for treating BOG, or may be designed to include only a BOG treatment facility having a capacity of treating a relatively small amount of BOG which is normally produced. Furthermore, since the collected BOG may be used as an energy source or stored and used later, it is possible to effectively utilize an energy source which may be discarded.

While the present invention has been described with respect to the specific embodiments, it will be apparent to those skilled in the art that various changes and modifications may be made without departing from the spirit and scope of the invention as defined in the following claims.

The invention claimed is:
1. A liquefied fuel supply ship comprising:
   a first fuel storage tank for containing liquid-phase fuel;
   a fuel supply pipe connected to the first fuel storage tank and configured to connect to a receiving ship for supplying liquid-phase fuel to a fuel tank of the receiving ship;

a boil-off gas (BOG) return pipe configured to connect to a fuel tank of the receiving ship for receiving BOG transferred from the fuel tank of the receiving ship;

a compressor in fluid communication with the BOG return pipe and configured to compress at least part of the BOG transferred from the receiving ship;

a liquefier in fluid communication with the BOG return pipe and configured to liquefy at least part of the BOG transferred from the receiving ship;

a second fuel storage tank in fluid communication with the BOG return pipe and configured to store at least part of the BOG transferred from the receiving ship in a gas phase; and at least one engine in fluid communication with the compressor and the second storage tank that are arranged in parallel between the at least one engine and the BOG return pipe, wherein the at least one engine is in fluid communication with the compressor for consumption of BOG compressed by the compressor and further in fluid communication with the second fuel storage tank for consumption of the at least part of the BOG transferred from the receiving ship and stored in the second fuel storage tank;

wherein the liquefied fuel supply ship is configured to direct at least part of the BOG liquefied by the liquefier to the first fuel storage tank to mix the liquefied BOG with the liquid-phase fuel contained in the first fuel storage tank while supplying the liquid-phase fuel from the first fuel storage tank to the receiving ship, wherein the liquefied fuel supply ship is configured to direct at least part of the BOG in the gas phase from the second fuel storage tank to the first fuel storage tank to mix with BOG of the liquid-phase fuel contained in the first fuel storage tank while supplying the liquid-phase fuel from the first fuel storage tank to the receiving ship, wherein the liquefied fuel supply ship is further configured to direct at least part of the BOG from the receiving ship to the first fuel storage tank to mix with BOG in the first fuel storage tank while supplying the liquid-phase fuel from the first fuel storage tank to the receiving ship.

2. The liquefied fuel supply ship of claim 1, further comprising a valve between the second fuel storage tank and the at least one engine, wherein the valve is configured to lower the pressure of the BOG from the second fuel storage tank before it reaches the at least one engine.

3. The liquefied fuel supply ship of claim 1, wherein the compressor is referred to a first compressor, wherein the liquefied fuel supply ship further comprises:

a second compressor connected to the BOG return pipe and configured to pressurize at least part of BOG received from the receiving ship, the second compressor located between the BOG return pipe and the second storage tank.

4. The liquefied fuel supply ship of claim 1, wherein the at least one engine further comprises a generator engine or turbine engine.

5. A liquefied fuel supply ship comprising:

a first fuel storage tank for containing liquid-phase fuel;

a fuel supply pipe connected to the first fuel storage tank and configured to connect to a receiving ship for supplying liquid-phase fuel to a fuel tank of the receiving ship;

a boil-off gas (BOG) return pipe configured to connect to a fuel tank of the receiving ship for receiving BOG transferred from the fuel tank of the receiving ship;

a compressor in fluid communication with the BOG return pipe and configured to compress at least part of the BOG transferred from the receiving ship;

a second fuel storage tank in fluid communication with the BOG return pipe and configured to store at least part of the BOG transferred from the receiving ship in a gas phase; and at least one engine in fluid communication with the compressor and the second storage tank that are arranged in parallel between the at least one engine and the BOG return pipe, wherein the at least one engine is in fluid communication with the compressor for consumption of BOG compressed by the compressor and further in fluid communication with the second fuel storage tank for consumption of the at least part of the BOG transferred from the receiving ship and stored in the second fuel storage tank;

wherein the liquefied fuel supply ship is configured to direct at least part of the BOG in the gas phase from the second fuel storage tank to the first fuel storage tank to mix with BOG of the liquid-phase fuel contained in the first fuel storage tank while supplying the liquid-phase fuel from the first fuel storage tank to the receiving ship, wherein the liquefied fuel supply ship is further configured to direct at least part of the BOG from the receiving ship to the first fuel storage tank to mix with BOG in within the first fuel storage tank while supplying the liquid-phase fuel from the first fuel storage tank to the receiving ship.

* * * * *